United States Patent [19]

Lasoen

[11] Patent Number: 5,145,469
[45] Date of Patent: Sep. 8, 1992

[54] TRANSMISSION RATIO SELECTOR MECHANISM

[75] Inventor: Jean J. Lasoen, Villepreux, France

[73] Assignee: Massey-Ferguson Services N.V., Netherlands

[21] Appl. No.: 669,046

[22] Filed: Mar. 14, 1991

[30] Foreign Application Priority Data

Mar. 15, 1990 [GB] United Kingdom ............... 9005817

[51] Int. Cl.⁵ ........................................... F16H 61/00
[52] U.S. Cl. ................................. 475/209; 74/473 R
[58] Field of Search .................... 74/473 R; 475/209

[56] References Cited

U.S. PATENT DOCUMENTS

| | | | |
|---|---|---|---|
| 3,774,475 | 11/1973 | Meysenburg et al. | 475/158 |
| 4,089,237 | 5/1978 | Scholz | 475/218 |
| 4,483,210 | 11/1984 | Mayuzumi | 74/360 |
| 4,846,322 | 7/1989 | Swank | 74/473 R X |
| 4,898,045 | 2/1990 | Baba | 74/473 R X |
| 4,986,142 | 1/1991 | Borodin et al. | 475/209 X |

FOREIGN PATENT DOCUMENTS 1336571 1/1971 United Kingdom .
1551414 8/1979 United Kingdom .

Primary Examiner—Rodney H. Bonck
Assistant Examiner—Daniel Wittels
Attorney, Agent, or Firm—MacMillan, Sobanski & Todd

[57] ABSTRACT

A transmission selector mechanism including two selector members (50, 51) connected with two coupling members (6, 7) each coupling member being axially slidable in both directions either side of a neutral position to couple a selected one of a pair of gears (10, 12: 11, 13) to an associated shaft (4, 5). The coupling members are connected with the selector members via an epicyclic gear train (56, 55, 54, 52). A first element (52) of the epicyclic is connected with one selector member (50), a second element (56) of the epicyclic is connected with one coupling member (6), and a third element (55) of the epicyclic is connected with the other selector member (5) and the other coupling member (7). The arrangement is such that by appropriate movement of the two selector members (50, 51) both coupling members (6, 7) can be positioned either on the same or opposite sides of their respective neutral positions. The other selector member (51) may operate in a control gate (51') in part of which the other selector member (51) is disconnected from the other coupling member (7) and selects operative ratios of an additional transmission stage or stages.

6 Claims, 8 Drawing Sheets

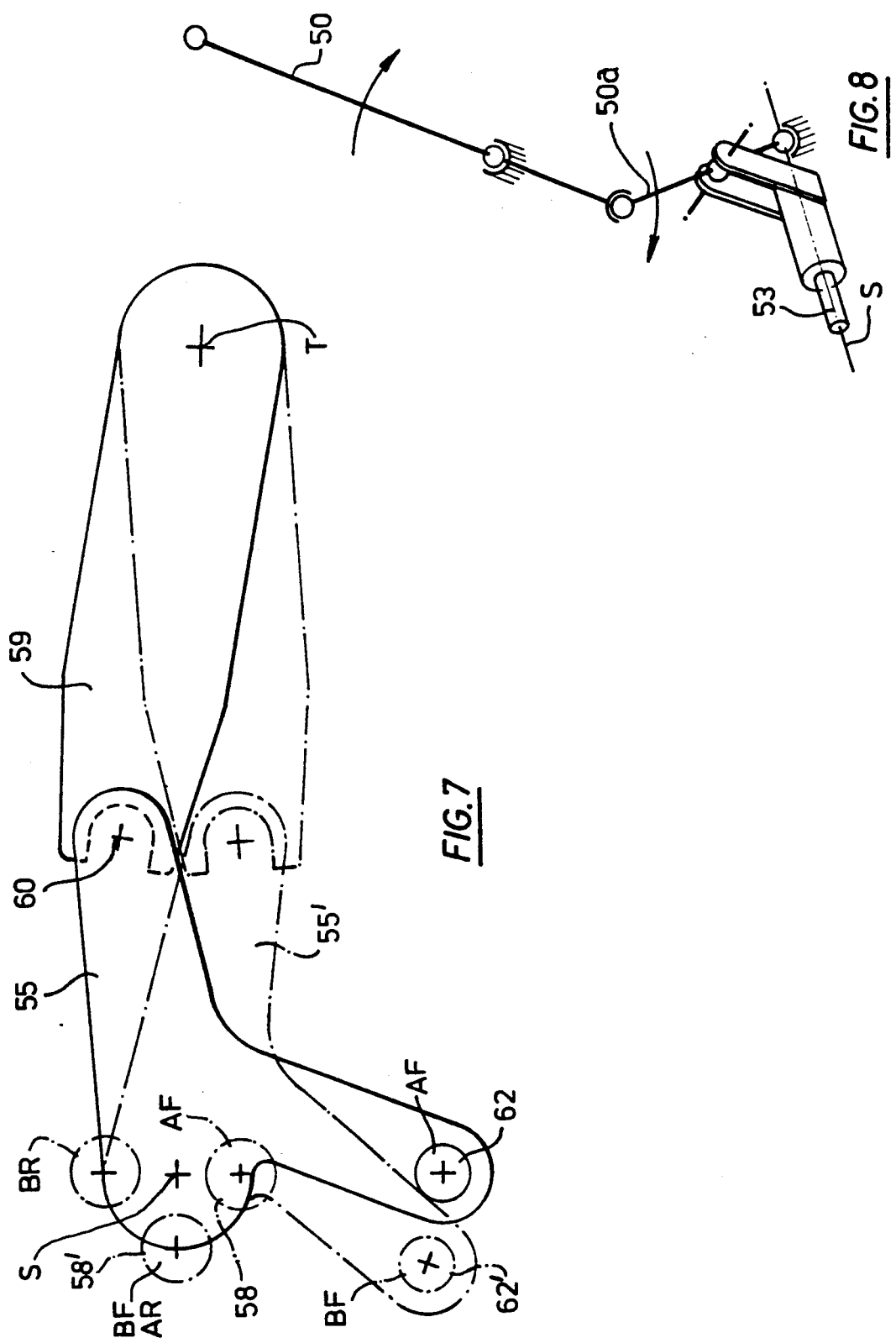

TRANSMISSION RATIO SELECTOR MECHANISM

BACKGROUND OF THE INVENTION

This invention relates to transmission ratio selector mechanisms for use with transmission stages of the type including two coupling members both of which are slidable either side of their respective neutral position to couple a selected one of a respective pair of gears to a respective shaft and both of which must be engaged to provide drive through the transmission stage.

GB-B-2055162 discloses an example of such a transmission stage which is used as an input stage into a multi-ratio tractor transmission. In this example one of the coupling members in the input stage selects either of a pair transmission ranges and the other coupling member selects the forward/reverse drive direction of the transmission.

SUMMARY OF THE INVENTION

It is an object of the present invention to provide an improved form of transmission ratio selector mechanism suitable for use with a transmission stage of the type described above.

It is a further object of the present invention to provide a selector mechanism which can be used to provide an ergonomic control for a multi-ratio transmission including a transmission stage of the type described above.

Thus according to a first aspect of the present invention there is provided a transmission selector mechanism including two selector members (eg gear levers) connected with two coupling members, each coupling member being axially slidable in both directions either side of a respective neutral position to couple a selected one of a pair of gears to an associated shaft, the mechanism being characterised in that the coupling members are connected with the selector members via an epicyclic gear train, a first element of the epicyclic being operatively connected with one selector member, a second element of the epicyclic being operatively connected with one coupling member, and a third element of the epicyclic being operatively connected with the other selector member and the other coupling member, the arrangement being such that by appropriate movement of the two selector members both coupling members can be positioned either on the same or opposite sides of their respective neutral positions.

In one form of the invention the epicyclic gear train includes meshing sun, planet and annulus gears and a planet carrier with the annulus connected with said one selector member, the sun connected with said one coupling member, and the carrier connected with said other selector member and other coupling member.

In an alternative arrangement of such epicyclic gear train the carrier is connected with said one selector member, the sun is connected with said one coupling member, and the annulus is connected with said other member and other coupling member.

If a transmission selector mechanism is used for the control of an input stage a multi-ratio transmission as described in GB-B-2055162 one coupling member can be used to select the operative transmission range and the other coupling member the forward/reverse drive direction.

A transmission selector mechanism in accordance with the present invention is also suitable for controlling additional stages of a multi-ratio transmission. For example, in addition to controlling the input stage of a transmission as described in GB-B-2055162, the selector mechanism may also control the selection of the operative speeds in a main speed selection stage of the transmission and a further range stage.

This control of more than one transmission stage can be achieved by arranging that said other selector member which is connected with the third element of the epicyclic and with the other coupling member operates in a control gate in part of which said other selector member is disengaged from the other coupling member and selects the operative ratio of the additional transmission stage (or stages) and in another part of which said other selector member operates the other coupling member.

In accordance with a second aspect of the present invention there is also provided a tractor transmission comprising two stages in series each stage having its own ratio selector mechanism including a ratio selector member (eg gear lever), and linkage means interconnecting the two selector mechanisms such that one of the selector members is able to make ratio selections in one of the stages directly and in the other stage via the linkage means.

In a transmission in accordance with the preceding paragraph one stage may include a forward/reverse function and a range change function and the other stage may include a speed change function as described above. In such a transmission one ratio selector member (eg gear lever) may select the forward/reverse drive direction whilst the other selector member (eg gear lever) may select the operative speed directly and the operative range via the linkage means.

The linkage means may conveniently include an epicyclic gear train connected in accordance with the first aspect of the present invention to link the two selector members with the coupling members in said one stage.

DESCRIPTION OF THE DRAWINGS

One embodiment of the present invention, as applied to a tractor transmission, will now be described, by way of example only, with reference to the accompanying drawings in which:

FIG. 7 is a diagrammatic representation of the various positions of the mechanism of FIG. 4;

FIG. 8 is a diagrammatic representation of a selector lever arrangement suitable for use with the present invention, and FIGS. 9a-9d—show diagrammatic representations of an alternative selector mechanism in accordance with the present invention in its various selection positions.

DETAILED DESCRIPTION OF THE PREFERRED EMBODIMENTS

Figure 1:
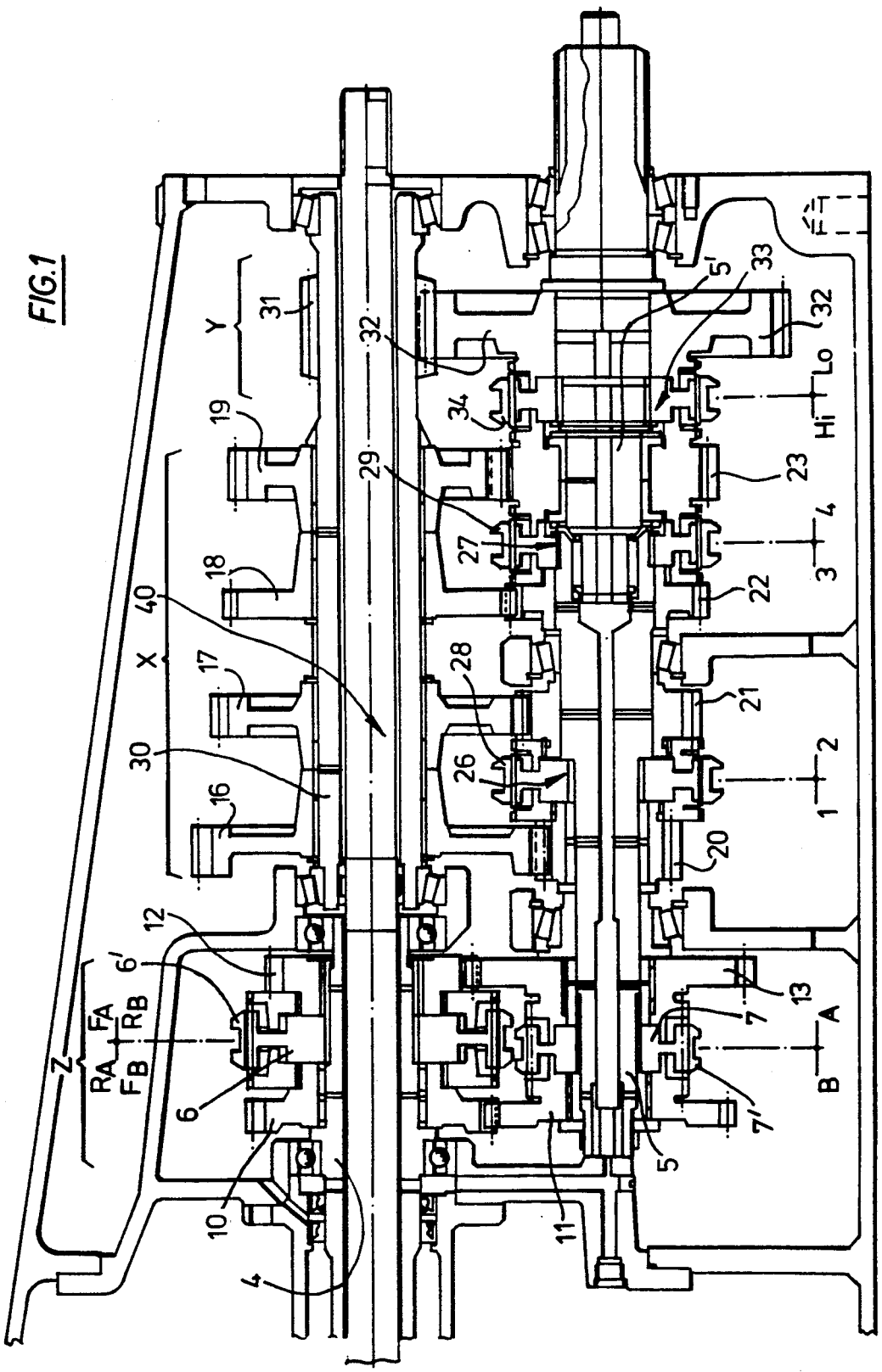
FIG. 1 shows a vertical section through a multi-ratio tractor transmission controlled by a selector mechanism in accordance with the present invention.

The multi-ratio transmission shown in FIG. 1 comprises a main 4-speed change speed stage X, a 2-speed high/low range change stage Y, and an input forward-/reverse and A/B range stage Z.

Figure 2:
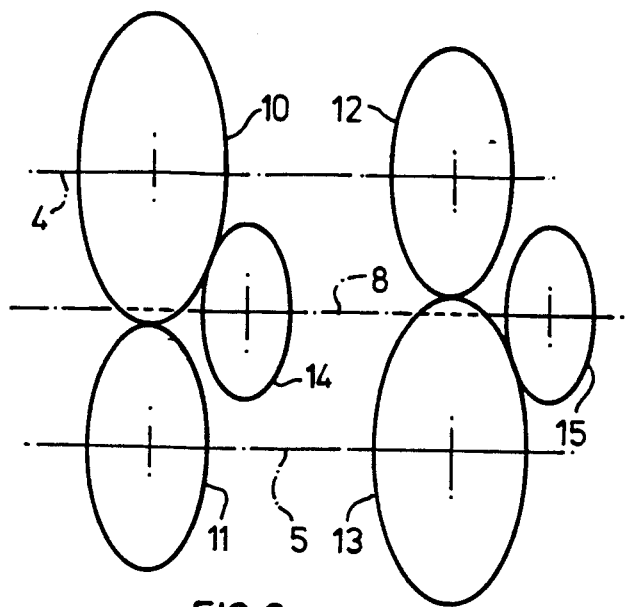
FIG. 2 shows diagrammatically part of the transmission of FIG. 1.

The input stage Z, which is shown diagrammatically in FIG. 2 comprises an input shaft 4 and an output shaft 5 which loosely carry train gears 10, 12, and 11, 13 respectively. These gears may be coupled to their respective shafts by synchromesh units 6 and 7 with slidable coupler 6' and 7' respectively. An idler shaft 8 is also provided (see FIG. 2) with gears 14 and 15 which rotate with shaft 8 and mesh with gears 10 and 13 respectively.

Figure 3A:
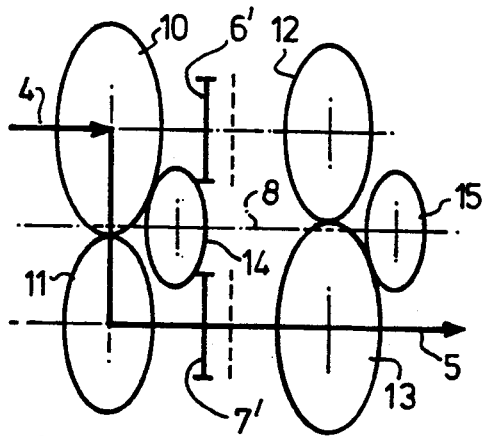
FIGS. 3a-3d—show the four drive conditions of that part of the transmission shown in FIG. 2.
Figure 3B:
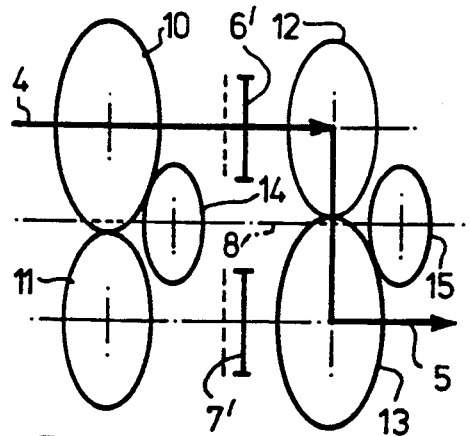

The input stage Z is capable of providing two forward drive ratios and two reverse drive ratios in the manner shown in FIGS. 3a–3b.

Thus with both couplers displaced to the left of their respective neutral positions as shown in FIG. 3a a higher forward drive ratio FB is obtained via gears 10 and 11. A lower forward drive ratio FA is obtained via gears 12 and 13 when both of the couplers are displaced to the right of their respective neutral positions as shown in FIG. 3b.

Figure 3C:
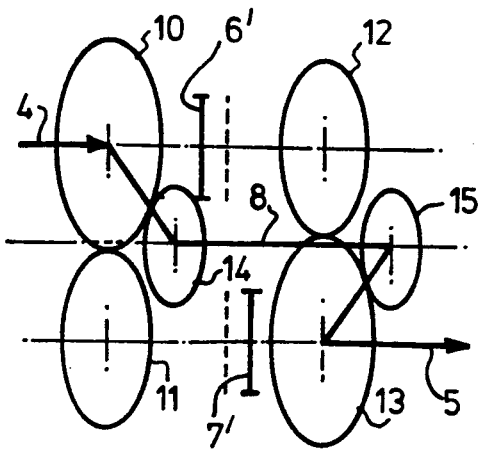

A lower reverse ratio RA is obtained via gears 10, 14, 15 and 13 when coupler 6' is displaced to the left and coupler 7' to the right of their respective neutral positions as shown in FIG. 3c.

Figure 3D:
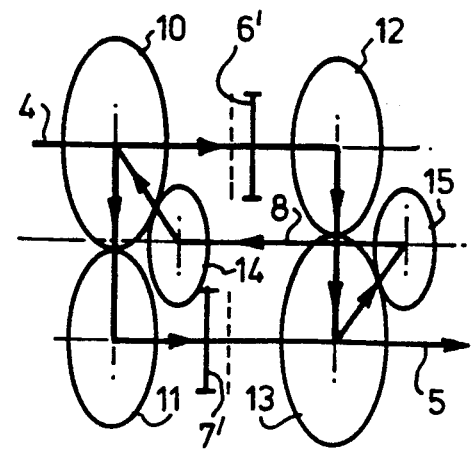

A higher reverse gear RB is obtained via gears 12, 13, 15, 14, 10 and 11 when coupler 6' is displaced to the right and coupler 7' to the left of their respective neutral positions as shown in FIG. 3d.

The main 4-speed change speed stage X comprises 4 gears 16, 17, 18 and 19 splined on a lay shaft 30 which surrounds the PTO shaft 40, these gears are in constant mesh with gears 20, 21 22 and 23 which are rotatably mounted on two portions 5 and 5' of the transmission output shaft. Synchromesh units 26 and 27 having coupling sleeves 28 and 29 respectively are provided for coupling gears 20, 21 and 22, 23 to the output shaft.

The high/low range change stage Y comprises a gear 31 on lay shaft 30 and a gear 32 rotatably mounted on output shaft portion 5'. A further synchromesh unit 33 with a coupling sleeve 34 is provided for coupling either gear 23 or 32 to the output shaft portion 5'. When coupling sleeve 34 is moved to the left, drive is transmitted to output shaft portion 5' via gear 23 and the high range is engaged. With the coupling sleeve 34 moved to the right, drive is transmitted to the output shaft portion 5' via gear 32 from lay shaft gear 31 and a low range is engaged.

With coupler 28 of stage X moved to the left as shown in FIG. 1, a first speed is obtained via gears 20 and 16, lay shaft 30 and then from lay shaft 30 to output shaft 5' via either gears 19, 23; or 31, 32 depending on the position of the range coupler 34.

Similarly, second and third speeds are obtained from stage X when gears 21 and 22 are respectively coupled to shaft 5. These gears transfer drive to lay shaft 30 via gears 17 and 18 respectively and drive is again transmitted to output shaft 5' via either gears 19, 23, or 31, 32.

A fourth speed is obtained when sleeve 29 is moved to the right to couple gear 23 to shaft portion 5'. Drive is then transmitted to shaft portion 5' either directly from gear 23 in the high range by moving coupler 34 to the left or via gears 23, 19, 31, 32 in the low range by moving coupler 34 to the right.

The Applicants have used a transmission of the form described above for some time in their agricultural tractors with a first selector lever controlling couplers 6' and 7' to determine which drive direction and which range (A or B) is selected and a second selector lever controlling couplers 28, 29 and 34 to determine which of the four ratios of the main stage X is selected and whether the high or low range is selected in stage Y.

Such an arrangement is not however ideal since if, for example, the operator wishes to change between the fourth ratio in range A and the first ratio in range B (which are adjacent ratios in the transmission) he has to move both the selector levers.

The present invention sets out to overcome this problem by providing a selector mechanism which will enable the selector lever which controls stages X and Y to also control the A/B range change selection of stage Z.

Figure 4:
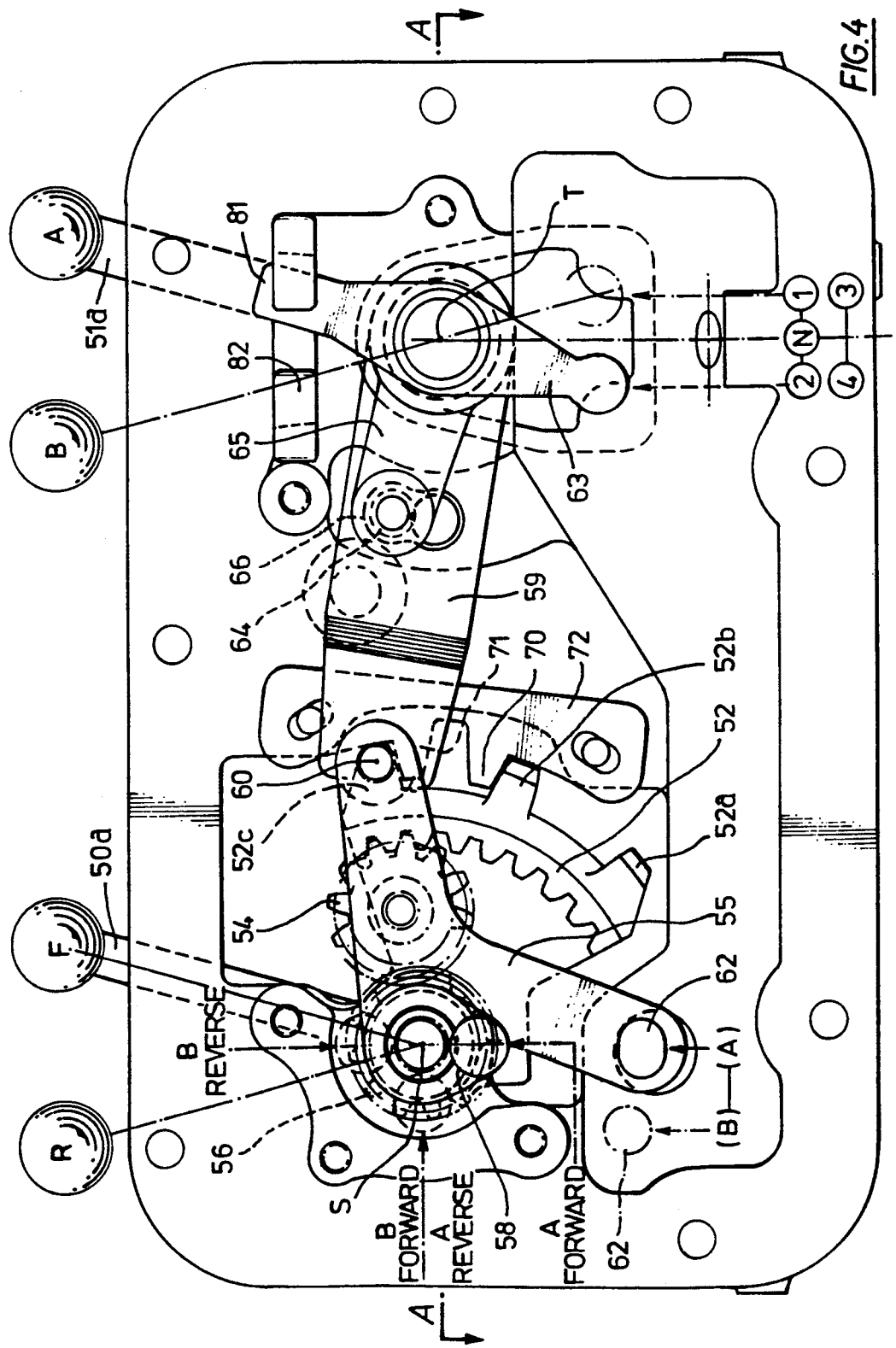
FIG. 4 is a side view of the selector mechanism of the present invention.
Figure 5:
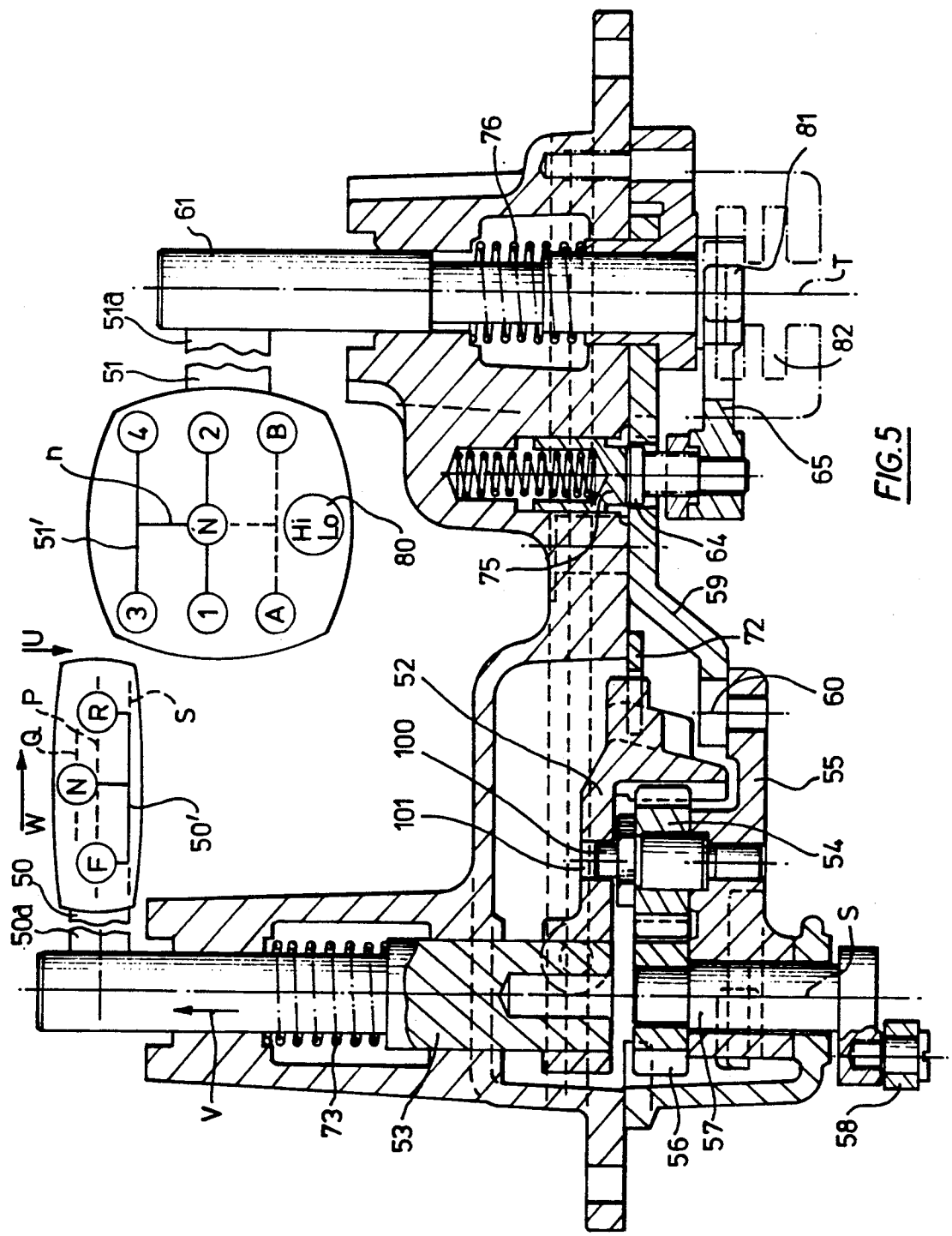
FIG. 5 is a section on the line A—A of FIG. 4.
Figure 6:
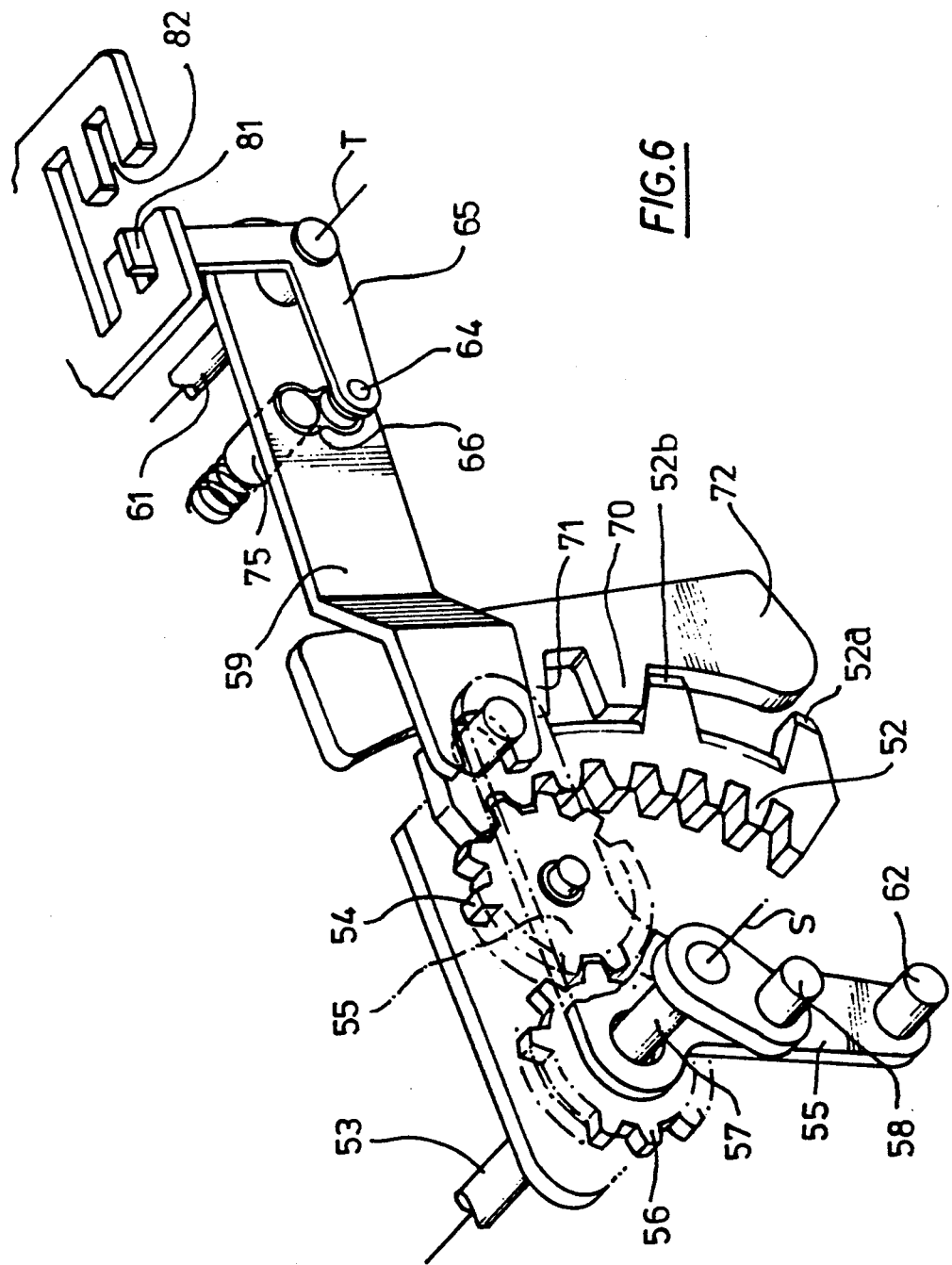
FIG. 6 is a diagrammatic perspective view of the mechanism of FIG. 4.

FIGS. 4 and 5 show the selector mechanism of the present invention which is also shown diagrammallly in FIGS. 6,7 and 8.

The mechanism includes two selector levers 50 and 51 the lower portions of which are shown in FIGS. 4 and 5 at 50 and 51 respectively. Selector lever 50 operates the forward/reverse drive direction selection of stage Z and lever 51 operates the A/B range selection of stage Z, the 4-speed selection of stage X and the high/low selection of stage Y.

Selector levers 50 and 51 may conveniently be of the form described in GB-B-2136516 and diagrammatically shown in FIG. 8 with the upper portion of the selector levers following the selection gates 50' and 51' respectively shown diagrammatically in FIG. 5. Due to the two part construction of the selector lever arrangement referred to above the lower portion 50a and 51a of each selector lever 50 and 51 shown in FIG. 4 pivots in the opposite sense to the upper portion which follows the control gates 50' and 51'.

The operation of the two selector levers 50 and 51 is inter-linked via an epicyclic gear train in the form of an annulus quadrant 52 which is splined onto a shaft 53 connected with the lower portion 50a of selector lever 50, a planet gear 54 mounted on a carrier 55 and meshing with annulus 52, and a sun gear 56 which is rotable about the same axis S as shaft 53.

Sun gear 56 is splined on shaft 57 which carries a forward/reverse selecting roller 58 mounted eccentrically relative to the axis of rotation S of the sun gear. Roller 58 engages a groove in a selector fork (not shown) which axially displaces sleeve 6'. Carrier 55 is pivotally connected with a lever 59 at 60 and carries an A/B range selecting roller 62 which engages a groove in a selector fork (not shown) which axially displaces sleeve 7'. Lever 59 is in turn mounted for pivoting about an axis T which is aligned with the axis of rotation of a shaft 61 connected with selector lever 51.

Refering to FIGS. 4 and 5 the annulus 52 has three external teeth 52a, 52b and 52c which are engageable with detent teeth 70 and 71 on detent plate 72. FIG. 4 shows the annulus 52 in the forward drive direction selection position with teeth 52b and 52c straddling both the detent teeth 70 and 71. The neutral selection position is achieved when annulus is rotated in an anti-clockwise sense so that tooth 52b is disposed between detent 70 and 71 and the reverse selection position is achieved when the annulus is rotated still further in an anti-clockwise sense so that teeth 52a and 52b straddle both the detent teeth 70 and 71.

With lever 50 in the neutral position, as shown in FIG. 5, tooth 52b is engaged between detent teeth 70 and 71 to prevent movement of annulus 52 and an interlock pin 100 provided as an extension of the mounting shaft of planet gear 54 engages an aperture 101 in annulus 52 to lock-up the epicyclic gear train. Without this interlock it would be possible for the operator to use lever 51 to change the operative range A/B of the transmission when the lever 50 was in its neutral position and in doing so move roller 58 via the epicyclic gear train thus inadvertently selecting the forward or reverse drive direction despite the fact that the lever 50 was in its neutral position.

When the lever 50 is in its forward or reverse selection position it occupies the plane P in the gate 50' which is to the left of neutral plane Q. With lever 50 in plane P, the teeth 52a, 52b, 52c and 70, 71 are still engaged appropriately depending on whether forward or reverse has been selected so that annulus 52 is held against rotation and the selected drive direction is maintained. However, annulus 52 is moved sufficiently to the right, as viewed in FIG. 5, to disengage detent pin 101 thus allowing lever 51 to move carrier 55 to enable A/B range changes to be made.

In order to effect a change in the drive direction the lever 50 is moved in direction U into plane S. Which is still further to the left of the plane P. This moves shaft 53 against the action of spring 73 in direction V to a position in which teeth 52a, 52b, 52c, disengage teeth 70, 71 and in which pin 100 is disengaged from aperture 101. Thus with lever 50 in plane S the annulus 52 can be moved between the forward, reverse and neutral positions.

For example, if the operator wishes to move from the forward drive position shown in FIG. 4 to the neutral position he moves lever 50 in direction U into plane S to move annulus 52 in direction V to disengage teeth 52a, 52b, 52c from detent teeth 70, 71, He then moves the lever 50 in direction W which rotates annulus 52 in an anti-clockwise sense to position tooth 52b opposite the gap between detent teeth 70, 71. This rotation of annulus 52 moves roller 58 via planet 54 and sun 56 to effect the necessary movement of coupler 6'. When the operator moves lever 50 into the neutral position in plane Q shaft 53 moves in the opposite direction to arrow V (assisted by spring 73) to ensure that annulus 52 is moved to engage tooth 52b between detent teeth 70, 71 and interlock pin 100 in aperture 101, thus locking the transmission in the neutral conditon.

Associated with shaft 61 is a selector finger 63 which co-operates with cutouts in two selector rails (not shown) for the selection of speed ratios 1-2 or 3-4 depending on the axial position of shaft 61. A selection gate follower 81 is also mounted on shaft 61 which moves in control gate 82 which corresponds to the gate 51' of lever 51.

Shaft 61 also carries an arm 65 on which a peg 64 is mounted. When the upper portion of selector lever 51 is in its neutral plane n and is moved to the left into the A/B selection plane the shaft 61 is moved to the right against the action of spring 76 causing the peg 64 to engage a cut-out 66 in lever 59 thus enabling the lever to be pivotted about axis T into the A or B range by moving the upper portion of lever 51 to the appropriate A or B position in gate 51'. Peg 64 and cut-out 66 are positioned and shaped so that the peg 64 can only engage cut-out 66 when the lever 51 is in its neutral plane n. This significantly reduces the inertia loads which synchromesh units 6 and 7 are required to handle when changes are made in the operative range of stage Z.

When peg 64 engages cut-out 66 it depresses a spring-loaded detent plunger 75 out of engagement with cut-out 66 to enable peg 64 to pivot lever 59. Plunger 75 normally engages cut-out 66 to hold lever 59 in either its A or B range selection position. Plunger 75 automatically re-engages cut-out 66 to maintain the selected A or B range position of lever 59 on disengagement of peg 64 from cut-out 66.

The selector mechanism operates as follows.

FIG. 4 and the solid lines in FIG. 7 shown the selector mechanism in the position to select the forward drive direction and the A range in stage Z when couplers 6' and 7' occupy the FIG. 3b position.

If the operator now decides to change to the B range forward drive condition he moves lever 51 whilst in the neutral plane n into the A/B selection plane against the action of spring 76 thus displacing shaft 61 to the right, as viewed in FIG. 5, to engage peg 64 in cut-out 66. He then moves the lever 51 to the B range selection position. This results in the anti-clockwise rotation of shaft 61 and lever 59, as viewed in FIGS. 4 and 7, which in turn rotates carrier 55 in a clockwise sense thus moving the carrier to the dotted line position 55' shown in FIG. 7 where the roller 62 on carrier 55 has moved to position 62' which is to the left of its FIG. 4 position. The clockwise rotation of carrier 55 causes planet gear 54, which is meshed with stationary annulus 52, to rotate in an anti-clockwise sense thus in turn rotating sun gear 56 in a clockwise sense to move the roller 58 to the position 58' which is to the left of its FIG. 4 position. Thus the associated couplers 6' and 7' now occupy the FIG. 3a position and select B range in the forward direction.

The vehicle operator may then return the lever 51 into the speed selection portion of gate 51' by releasing the side pressure on lever 51, which will allow shaft 61 and peg 64 to displace under the action of spring 76 to disengage peg 64 from cut-out 66 thus holding the lever 59 and hence the carrier 55 in the B range selection position, and then rotating lever 51 back to the neutral position, whereupon the selector finger 63 is free to engage the selector rails for the selection of speed ratios 1-2 and 3-4.

If the vehicle operator wishes to change from the forward drive condition in range A shown in FIG. 4 and FIG. 3b to the reverse drive condition in range A shown in FIG. 3c he moves lever 50 side ways in direction U into plane S to displace shaft 53 and annulus 52 against spring 73 to disengage teeth 52a, 52b and 52c from detent teeth 70 and 71. He then moves the lever 50 in direction W towards the reverse drive position R in gate 50' which rotates shaft 73 and annulus 52 in an anti-clockwise sense as viewed in FIG. 4 to a position in which teeth 52a and 52b straddle detent teeth 70 and 71.

This anti-clockwise rotation of annulus 52 also rotates planet 54 in an anti-clockwise sense and sun gear 56 in a clockwise sense so that roller 58 moves on its eccentric mount from position 58 indicated in FIG. 7 to position 58' of FIG. 7 so that the associated couplers 6' and 7' are now in the 3c position.

Movement of lever 50 into reverse selection position R in plane P re-engages teeth 52a and 52b with the teeth 70 and 71 to hold the annulus 52 in the reverse drive selection position.

It will be evident from the above movement of levers 50 and 51 the appropriate selection positions in gates 50' and 51' the couplers 6' and 7' can be positioned in the four positions shown in FIGS. 3a-3d.

The high/low range selection of gear set Y is achieved using a switch mounted on the upper lever portion 51 as indicated diagrammatically at 80 on gate 51'. Operation of switch 80 operates a solenoid operated valve (not shown) which in turn operates an hydraulic cylinder to move a selector fork associated with coupler 34.

FIGS. 9a to 9d show diagrammatically an alternative form of epicyclic connection between couplers 6' and 7' and the levers 50 and 51.

In this arrangement the lever 50 is connected with a carrier 155 of the epicyclic, the lever 51 is connected with an annulus quadrant 152 and with the coupler 6' via a forward/reverse selector roller 158, and the coupler 7' is connected with sun 156 via an A/B range change selector roller 162.

Figure 9A:
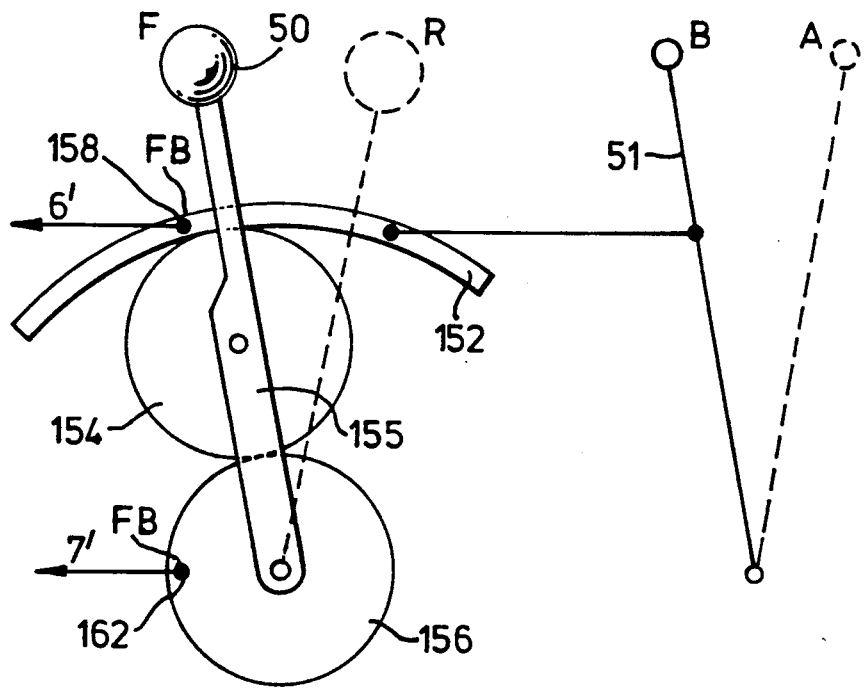

FIG. 9a shows the arrangement in the forward drive direction and range B condition shown in FIG. 3a.

Figure 9B:
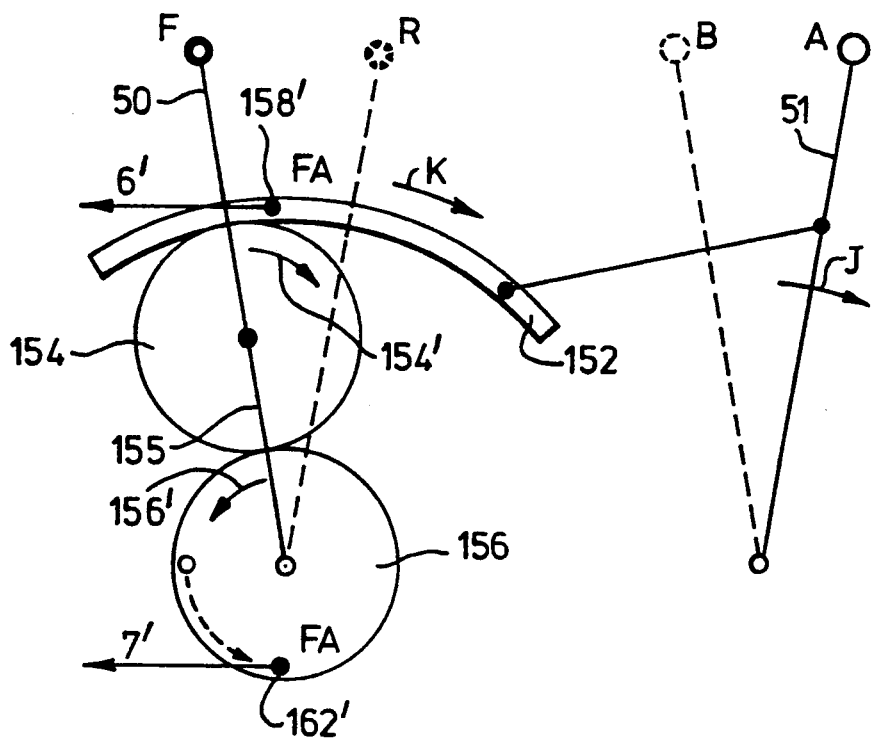

If the operator wishes to move to the forward range A position shown in FIGS. 9b and 3b he moves lever 51 in direction J to the position shown in FIG. 9b. This displaces annulus 152 in direction K and moves roller 158 to the position 158' shown in FIG. 9b and rotates planet 154 and sun 156 in the senses indicated by arrows 154' and 156' in FIG. 9b to move roller 162 to position 162' of FIG. 9b. Thus couplers 6' and 7' are moved by their respective rollers 158 and 162 to the FIG. 3b position to select range A in the forward drive direction.

Figure 9C:
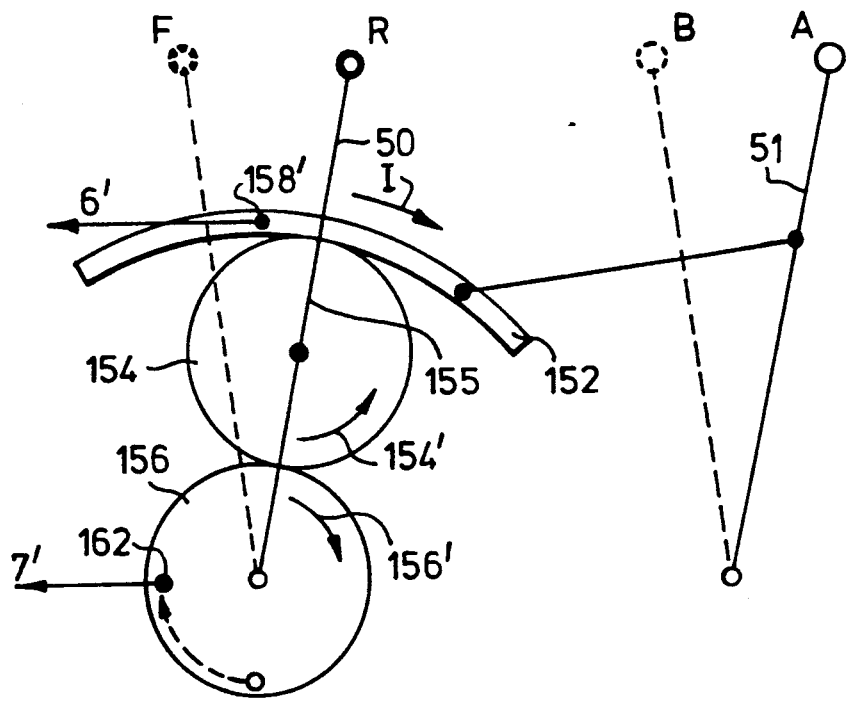

To select the reverse drive direction in range A from the FIG. 9b position the lever 50 is moved to the FIG. 9c position which mover carrier 155 in direction I of FIG. 9c. Since annulus 152 is held stationary this movement of carrier 155 rotates planet 154 and sun 156 in the senses indicated by arrows 154' and 156' in FIG. 9c to move roller 162 to the position indicated in FIG. 9c in which the associated couplers 6' and 7' occupy the FIG. 3d position.

Figure 9D:
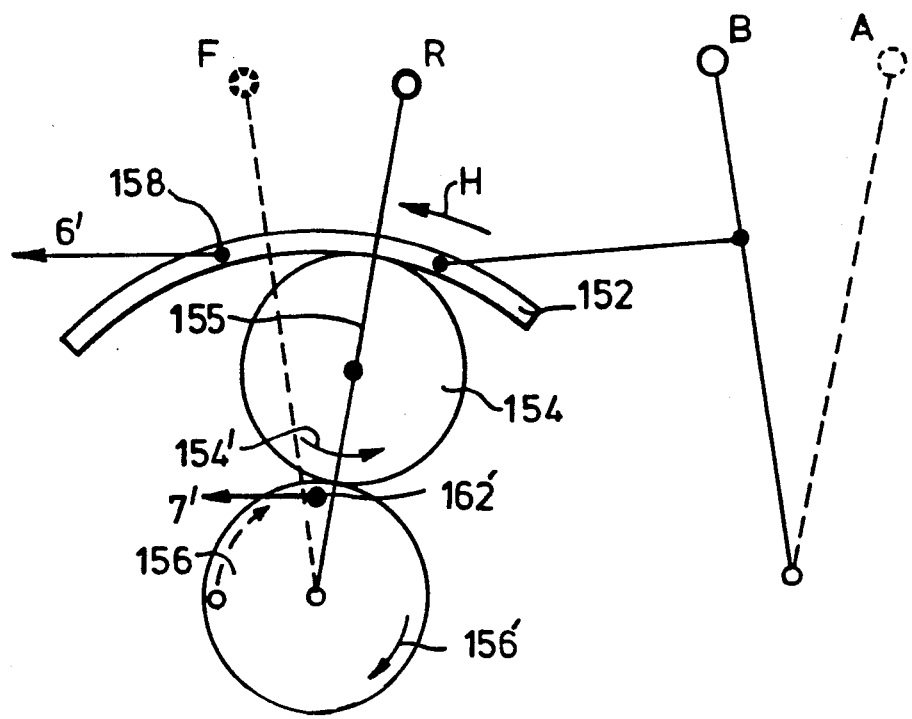

To select reverse drive direction in range B from FIG. 9c the lever 51 is moved to the FIG. 9d position. This moves annulus 152 in direction H so that roller 158 occupies the position shown in FIG. 9d and causes planet 154 and sun 156 to rotate in the sense of arrows 154' and 156' of FIG. 9d to move roller 162 to the 162' position of FIG. 9d. Thus couplers 6' and 7' occupy the FIG. 3c position.

I claim:

1. A transmission ratio selector mechanism including two selector members connected with two coupling members, each coupling member being axially slidable to either side of a respective neutral position to couple a selected one of a respective pair of gears to a respective associated shaft, the coupling members being connected with the selector members via an epicyclic gear train comprising first, second and third elements, said first element of the epicyclic gear train being operatively connected with one selector member, said second element of the epicyclic gear train being operatively connected with one coupling member, and said third element of the epicyclic gear train being operatively connected with the other selector member and the other coupling member, the arrangement being such that by appropriate movement of the two selector members, the coupling members can be positioned to provide four different combinations of positions, these being:

(i) both coupling members to the right of their respective neutral positions,
    (ii) both coupling members to the left of their respective neutral positions,
    (iii) the one coupling member to the right of its neutral position and the other coupling member to the left of its neutral position, and
    (iv) the one coupling member to the left of its neutral position and the other coupling member to the right of its neutral position, each combination providing a respective gear ratio.

2. A transmission ratio selector mechanism according to claim 1 in which the epicyclic gear train includes meshing sun, planet and annulus gears and a planet carrier with the annulus gear being said first element, the sun gear being said second element, and the planet carrier being said third element.

3. A transmission ratio selector mechanism according to claim 1 in which the epicyclic gear train includes meshing sun, planet and annulus gears and a planet carrier with the planet carrier being said first element, the sun gear being said second element, and the annulus gear being said third element.

4. A transmission ratio selector mechanism according to claim 1 in which said other selector member operates in a control gate in part of which said other selector member is disengaged from the other coupling member and selects operative ratios of an additional transmission stage or stages and in another part of which said other selector member operates the other coupling member.

5. A vehicle transmission comprising first and second stages in series controlled by a selector mechanism according to claim 1 in which both the selector members control the first stage of the transmission via the epicyclic gear train and said other selector member is movable to positions in a control gate in which said other selector member is disengaged from the other coupling member and said other selector member selects operative ratios in the second stage of the transmission.

6. A vehicle transmission comprising first and second stages in series controlled by a transmission ratio selector mechanism according to claim 1 wherein:

the first stage includes a forward/reverse function and a range change function;
    the second stage includes a speed change function; and
    the transmission ratio selector mechanism includes two ratio selector members, one selector member being arranged to select the forward/reverse drive direction of the first stage and the other selector member being arranged to select the operative speed of the second stage and the operative range of the first stage.

* * * * *